L. GAINES.
LOCK FOR STEERING WHEELS.
APPLICATION FILED JUNE 9, 1915.

1,234,748.

Patented July 31, 1917.

WITNESSES:

Lloyd Gaines, INVENTOR

BY

Attorney

UNITED STATES PATENT OFFICE.

LLOYD GAINES, OF BUTLER, MISSOURI.

LOCK FOR STEERING-WHEELS.

1,234,748.   Specification of Letters Patent.   Patented July 31, 1917.

Application filed June 9, 1915. Serial No. 33,153.

*To all whom it may concern:*

Be it known that I, LLOYD GAINES, citizen of the United States, residing at Butler, in the county of Bates and State of Missouri, have invented a new and useful Lock for Steering-Wheels, of which the following is a specification.

This invention relates to an improvement in locks for steering wheels, and the object is to provide means which may be actuated by the foot of the operator of an automobile, for locking the steering shaft against rotation, so that the operator can remove his hands from the steering wheel and the machine will be caused to travel in the same path in which it was directed.

The invention consists of certain novel features of construction and combinations of parts which will be hereinafter described and pointed out in the claims. It will be evident that many slight changes may be made in the form and arrangement of the several parts to be described without departing from the spirit and scope of the invention, and hence I do not wish to be limited to the exact construction herein set forth.

In the accompanying drawings,—

Figure 1:
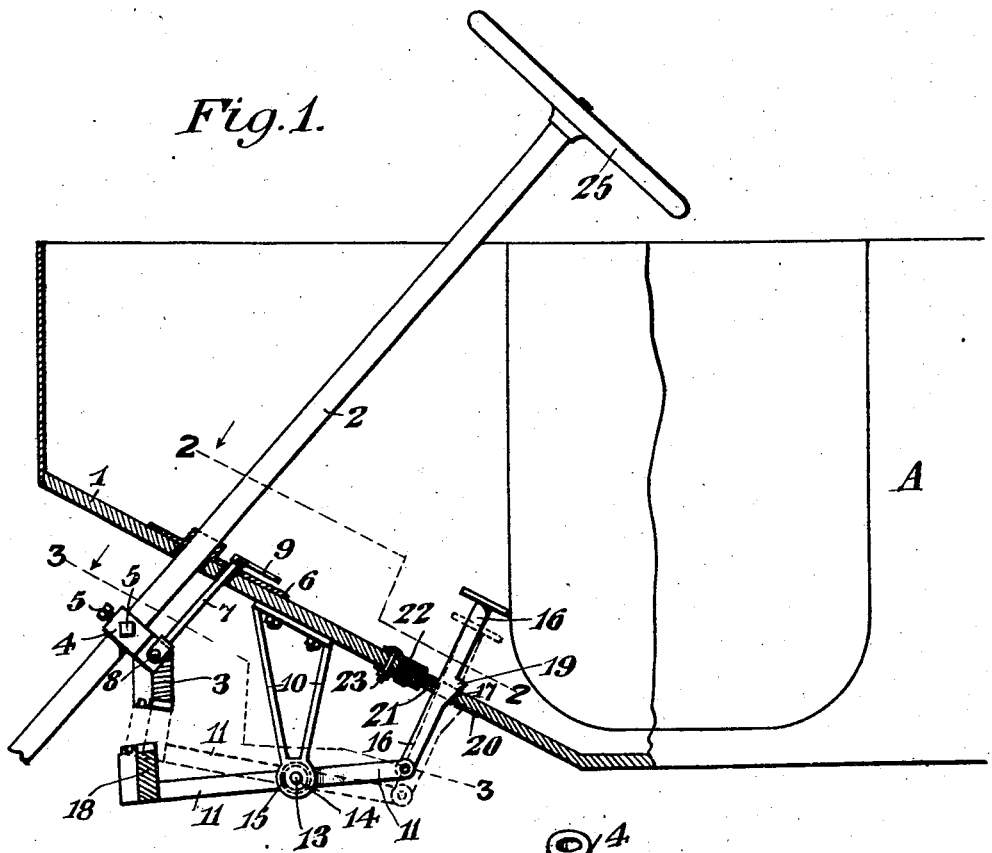
Figure 1 is a view in elevation of the invention, showing it applied to the foot board or floor of an automobile, which is shown in section.
Figure 2:
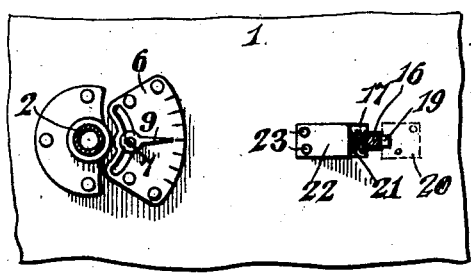
Fig. 2 is a detail view in top plan of the floor or foot board, showing the steering shaft and foot pedal in section, on line 2—2 of Fig. 1.
Figure 4:
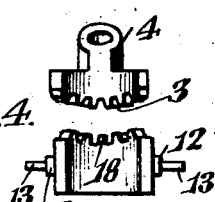
Fig. 4 is a view in elevation of the segmental rack and gear.
Figure 3:
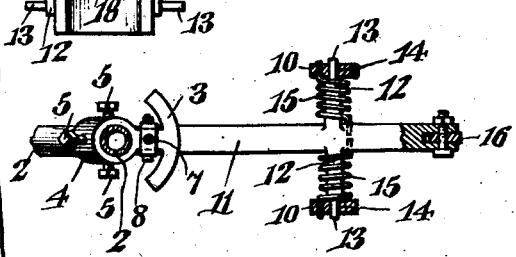
Fig. 3 is a sectional view taken on the line 3—3 of Fig. 1.

A represents the body of an automobile, and 1 is the foot board through which the steering shaft 2 extends. Mounted upon the shaft 2, and beneath the foot board 1, is a segment rack 3. The segment rack is provided with a collar 4 which is fitted on the shaft 2 and held against movement by a set screw 5. An indicator plate 6 is mounted upon the upper surface of the foot board 1, and a rod 7 extends through the plate 6 and foot board, and is connected by a pin 8 to the segment rack 3.

A pointer or hand 9 is connected to the rod 7 and is adapted to travel across the indicator plate 6, upon the rotation of the shaft 2, so that the operator may know the direction in which the machine is traveling.

Hangers or brackets 10 are connected to the underside of the foot board 1, and journaled on the brackets is a lever 11. The lever 11 is provided with arms 12, the arms 12 being provided with trunnions 13 which extend through openings 14 in the brackets 10. Coiled springs 15 are mounted upon the arms 12 and the terminals of these springs engage the lever 11 and brackets 10.

A foot pedal 16 is pivotally connected to one terminal of the lever 11 and extends through an opening 17 in the floor or foot board for actuating the lever.

A segment gear 18 is connected to the lever 11 and is adapted to be brought into engagement with the segment rack when the foot pedal 16 is forced downwardly. This downward movement of the foot pedal causes the springs 15 to be placed under tension, so that upon the releasing of the pedal by the foot of the operator, the foot pedal will be caused to move upwardly, thereby withdrawing the segment gear 18 from engagement with the segment rack 3.

The foot pedal 16 is provided with a tooth or projection 19, which is adapted to be brought into engagement with a plate 20, connected to the underside of the foot board 1, when the pedal has been moved downwardly, for holding the teeth of the segment gear 18 in engagement with the teeth of the segment rack 3.

The spring 21 is mounted in a suitable housing or casing 22 in the opening or slot 17, and engages the pedal 16 for forcing the pedal into engagement with a wall of the opening 17 so that the tooth 19 will engage the plate 20 when the pedal is moved downwardly.

The housing 22 is held in position by bolts 23, which pass through the housing and foot board. When it is desired to fasten or lock the steering shaft 2 against rotation, so that the operator may release the steering wheel 25 on the shaft 2, and allow the machine to travel along a given course without the necessity of the operator constantly holding the steering wheel, the operator will press the foot pedal 16 downwardly, causing the tooth 19 to engage the plate 20 on the foot board 1, and the teeth of the segment gear 18 to engage the teeth of the segment rack 3. The operator can remove his foot from the foot pedal after the tooth 19 has been brought into engagement with the plate 20, as the spring 21 will maintain the foot pedal against the wall of the opening, so that the tooth will remain in engagement with the plate 20, and there will be no danger of the segment gear 18 becoming disengaged from the segment rack 3.

When it is desired to release the segment gear from the segment rack, the foot pedal is forced downwardly and forwardly, so that the tooth 19 can pass through the opening 17, and upon the releasing of the pedal by the foot, the springs 15 will force the pedal upwardly through the opening 17 and cause the segment gear to be disengaged from the segment rack 3.

It will be observed that the rack 3 faces downwardly while the gear 18 faces upwardly, and that the spring 15 holds the gear separated from the rack, as disclosed in Fig. 1 of the drawing. The movement of the pedal downwardly to force the gear into meshing engagement with the rack also effects the locking of the pedal, said locking taking place upon the completion of the downward movement to effect the stated result. In other words, the extent of the downward movement of the pedal is governed by the throw of the lever. As soon as positive engagement between the gear and the rack has been secured, then the lever and pedal are automatically locked.

From the foregoing it will be seen that I have provided a construction which can be applied to an automobile readily, and at a small cost.

The steering shaft when locked against rotation will prevent the machine deviating from the course in which it is traveling. The steering shaft can be released instantly by the operator by simply forcing the foot pedal downwardly and forwardly, to cause the tooth 19 to become disengaged from the plate 20, when the springs 15 will force the pedal upwardly and withdraw the segment gear from engagement with the segment rack.

The brackets or hangers 10 may be connected to the frame or running gear of an automobile, when conditions warrant it, instead of the foot board.

What is claimed is,—

1. The combination with a steering shaft having a segment rack rigidly connected thereto at an intermediate point of its length, said rack facing downwardly, of a lever having a segment gear also rigidly secured thereto and facing upwardly, means for holding the gear below the plane of said rack, means for moving the lever to force the segment gear upwardly into meshing engagement with said rack, and means for locking the lever when the gear and rack are so engaged.

2. In combination with the body of an automobile, a steering shaft having a segment rack rigidly connected thereto below the footboard of the body, said rack facing downwardly, a lever arranged below the footboard and pivoted at an intermediate point of its length and having a segment gear rigidly secured thereto at its outer end, said gear facing upwardly, a pedal pivotally connected to the inner end of the lever and working through the footboard for moving the gear into engagement with the rack, a spring for holding the gear below the plane of said rack, and means for locking the pedal at the completion of its downward movement to rigidly retain the gear in engagement with the rack.

3. In combination with the body of an automobile, a steering shaft having a segment rack rigidly connected thereto below the footboard of the body, a lever arranged below the footboard and pivoted at an intermediate point of its length, and having a toothed portion rigidly secured thereto at its outer end, a spring mounted on the lever for holding the toothed portion below the plane of said rack, a pedal pivotally connected to the inner end of the lever and working through the footboard for moving the toothed portion into engagement with the rack, and means mounted on the footboard and coöperating with the pedal to lock the same at the completion of its downward movement thereby locking the toothed portion of the lever in engagement with the rack.

4. The combination with a steering shaft having a segment rack rigidly secured thereto at an intermediate point of its length, of a lever pivoted intermediately of its length and provided at its outer end with a rigidly mounted segment gear, means connected with the lever for normally holding the gear below the plane of said rack, a foot pedal connected to the inner end of said lever, and locking means for the foot pedal brought into action upon the completion of the downward movement of the pedal, which downward movement effects the engagement of the gear with the rack to lock the steering shaft from movement.

5. The combination with a steering shaft having a segment rack rigidly secured thereto at an intermediate point of its length, of a lever provided at its outer end with a rigidly mounted segment gear, spring-actuated means for normally holding the gear on the lever below the plane of the rack, a pedal connected to the lever for moving the same into opposition to the spring to bring the gear into engagement with the rack, and locking means for the foot pedal for locking the same upon the completion of its downward movement, the movement of the pedal to bring the locking means into engagement therewith being substantially equal to the throw of the lever to cause the engagement of the gear with the rack, whereby when such engagement is effected, the steering shaft is rigidly locked from movement.

6. The combination with a footboard and steering shaft of a motor driven vehicle, hangers connected to the footboard, of a lever having arms, said arms journaled in the hangers, springs mounted on the arms connected to the hangers and lever, means on the steering shaft to be engaged by the lever for holding the shaft against rotation, said springs being adapted to normally hold the lever out of engagement with the means on the steering shaft, and means for actuating the lever.

7. In combination with the footboard and steering shaft of a motor driven vehicle, an indicator plate on the footboard, a pointer coöperating with the indicator plate, and a rod connected to the pointer and extending through the footboard and connected with the steering shaft and movable therewith, a pedal, and means operated by the latter for locking the steering shaft against movement so as to retain the shaft in any predetermined position.

8. In combination with the footboard and steering shaft of a motor driven vehicle, a segment rack rigidly mounted on the steering shaft below the footboard, an indicator plate mounted on the footboard adjacent the steering shaft, a pointer movable over the indicator plate, means connecting the pointer to the rack so as to move therewith, said means passing downwardly through the footboard, and pedal actuated means adapted to be brought into engagement with the rack to lock the same and thereby hold the steering shaft from movement after its position has been determined.

In testimony, that I claim the foregoing as my own, I have hereto affixed my signature in the presence of two witnesses.

LLOYD GAINES.

Witnesses:
HARRY H. HENRY,
CARL J. HENRY.